United States Patent [19]
Steinmetz et al.

[11] Patent Number: 5,812,854
[45] Date of Patent: Sep. 22, 1998

[54] MECHANISM FOR INTEGRATING USER-DEFINED INSTRUCTIONS WITH COMPILER-GENERATED INSTRUCTIONS AND FOR OPTIMIZING THE INTEGRATED INSTRUCTION STREAM

[75] Inventors: Peter Jerome Steinmetz; Ann C. Smith, both of Rochester, Minn.

[73] Assignee: International Business Machines Corporation, Armonk, N.Y.

[21] Appl. No.: 617,253

[22] Filed: Mar. 18, 1996

[51] Int. Cl.⁶ .................................................. G06F 9/45
[52] U.S. Cl. ........................ 395/709; 395/707; 395/705
[58] Field of Search .......................... 395/707, 701–703, 395/705–706, 709–710; 364/280.4, 280.5, 280.1, 280

[56] References Cited

U.S. PATENT DOCUMENTS

| | | | |
|---|---|---|---|
| 5,175,856 | 12/1992 | Van Dyke et al. | 395/704 |
| 5,230,050 | 7/1993 | Iitsuka et al. | 395/707 |
| 5,274,815 | 12/1993 | Trissel et al. | 395/700 |
| 5,303,380 | 4/1994 | Tenny et al. | 395/700 |
| 5,339,436 | 8/1994 | Tairaku et al. | 395/700 |
| 5,375,242 | 12/1994 | Kumar et al. | 395/707 |
| 5,396,631 | 3/1995 | Hayashi et al. | 395/707 |
| 5,421,016 | 5/1995 | Connor et al. | 395/700 |
| 5,606,697 | 2/1997 | Ono | 395/707 |

*Primary Examiner*—Emanuel Todd Voeltz
*Assistant Examiner*—Tuan Q. Dam
*Attorney, Agent, or Firm*—Schmeiser, Olsen & Watts

[57] ABSTRACT

According to the preferred embodiment of the present invention, an apparatus and method for integrating a user-defined instruction stream with a compiler-generated instruction stream is provided. The method can be implemented for a variety of source code types and target hardware platforms. The method comprises the steps of translating the compiler-generated instruction stream to a machine-dependent intermediate form, translating the user-defined instruction stream to a machine-dependent intermediate form, integrating the user-defined instruction stream with the compiler-generated instruction stream, and optimizing the integrated instruction stream.

24 Claims, 4 Drawing Sheets

MECHANISM FOR INTEGRATING USER-DEFINED INSTRUCTIONS WITH COMPILER-GENERATED INSTRUCTIONS AND FOR OPTIMIZING THE INTEGRATED INSTRUCTION STREAM

FIELD OF THE INVENTION

This invention generally relates to computer systems. More specifically, this invention relates to a method and apparatus for efficiently integrating instructions in a computer program.

BACKGROUND OF THE INVENTION

The development of the EDVAC computer system in 1948 is often cited as the beginning of the computer era. Since that time, computer systems have evolved into extremely sophisticated devices. However, even today's most sophisticated computer systems continue to include many of the basic features that were present in some of the first computer systems. One such feature is the computer system's use of a program to control its actions. A computer system's program controls all functions performed by the computer. Because of this, the performance of a computer system is linked directly to the efficiency and optimization of the program it is running.

Computer programs are typically written using various types of programming languages. These programming languages typically fall into one of two categories, low level or high level. Once written these programs are then assembled or compiled into "machine code" that can be run by the computer.

Before they can be run, programs written in low level languages, such as assembler code, need only be translated into a form that can be understood by a computer, called machine code. This is a relatively simple translation because assembler code is essentially a human readable representation of the actual machine code used by a computer, with a direct one-to-one relationship between assembler and machine code operations. Thus, low level languages have the advantage of allowing the programmer to more precisely control the operation of the computer, allowing more efficient code. Unfortunately, they have the disadvantage of being much more labor intensive to use. Additionally, low level languages such as assembler code are hardware specific, and the assembler code for various types of hardware can vary significantly. For the discussion herein, code portions written in low level languages by a programmer are called "user-defined instructions" or "user-defined code."

High level languages, in contrast, have numerous predetermined instructions that simplify the programmer's job of writing the computer program, thereby enhancing the progranuner's efficiency. Thus, for efficiency reasons, the majority of a computer program is usually written in a high level language, such as C or Pascal. Additionally, high level languages allow programs to be written in a machine independent fashion, meaning the program can be used by many different types of computer hardware. However, programs written in a high level language cannot be understood by a computer in that form. For these reasons, the program must be translated or "compiled" into machine code. Typically, an intermediate step in compiling a high level language to machine code is to translate the high level language to a low level language. For the discussion herein, code portions originating from a high level language source code are called "compiler-generated instructions" or "compiler-generated code."

The process of compiling a program into machine code can include optimization of the program. Optimization of computer programs entails ordering and sequencing the code, along with efficiently using a computer's resources, in order to produce the fastest and most efficient operation. Optimizing compilers may optimize a computer program at various stages during the compilation process.

Unfortunately, the ability of optimizing compilers to effectively optimize computer programs is somewhat limited. Compiler-generated instructions typically result in inefficiencies and slower performance than is possible using user-defined instructions. For this reason, functions that are extremely important to the performance of the computer program are typically user-defined, i.e., written in a low level language, such as assembler code. By using such a low level language for critical functions, a skilled programmer can create very efficient code. Additionally, some of a computer's functions may not be accessible via the commands of a high level language, thus it may be necessary to write portions of a program in a low level language in order to take advantage of those functions.

Known optimizing compilers merge the user-defined instructions with the compiler-generated instructions after the compiler has already optimized the compiler-generated instructions. Unfortunately, these known compilers have numerous disadvantages. First, the compiler's optimization decisions were based solely on the compiler-generated instructions with no regard for the fact that the user-defined instructions, once integrated, could have dramatic effects on those optimization decisions. Second, the user-defined code may have been carefully crafted to perform well, but performance could be negatively impacted when the code is integrated into the unknown context of the compiler-generated code. And finally, the user-defined code is never optimized by the compiler. The result is an integrated instruction stream that is non-optimal.

As described above, the known methods of compiling and optimizing program code suffer from drawbacks. Integrating user-defined portions of code with previously optimized compiler-generated code impairs the performance of a computer. Without methods and apparatus for compiling and optimizing user-defined code along with compiler-generated code, incomplete optimization will continue to be an impediment to the overall performance of a computer system.

SUMMARY OF THE INVENTION

It is, therefore, an advantage of this invention to provide an enhanced method and mechanism for integrating user-defined instruction streams with compiler-generated instruction streams.

It is another advantage of this invention to provide an integration method that allows for further optimization of the program code after integration.

These and other advantages of the present invention are accomplished by the enhanced code integration method disclosed herein.

According to the present invention, an apparatus and method for integrating a user-defined instruction stream with a compiler-generated instruction stream is provided. The method comprises the steps of translating the high-level language source code to a compiler-generated machine-dependent intermediate code, translating the user-defined instruction stream to a machine-dependent intermediate code, integrating the compiler-generated machine-dependent intermediate code with the translated user-defined machine-dependent intermediate code, and then optimizing the integrated code.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DESCRIPTION OF THE PREFERRED EMBODIMENTS

OVERVIEW

The method and apparatus of the present invention has particular applicability to the field of compilers, and specifically to the methods used in optimizing compilers. For those individuals who are not compiler experts, a brief overview of compilers, optimization and code integration methods is provided.

Compilers

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. This source code instruction stream may be in the form of a high level language. Examples of high level languages include C, C++, Visual Basic, ADA, Modula-2, Pascal, Fortran and Cobol. After programming the source code, the programmer then uses mechanisms that change the human readable form of the computer program into a form that can be understood by a computer system (called machine readable form, machine code or object code). These mechanisms are typically called compilers; however, it should be understood that the term "compiler", as used within this specification, generically refers to any mechanism that transforms one representation of a computer program into another representation of that program. Note, however, that compiler-generated code as used herein refers to code that a compiler generates from source code, while user-defined code refers to code that is manually generated in a low level language.

This machine readable form, within this specification, is a stream of binary instructions (i.e., ones and zeros) that are meaningful to the computer. The compiler typically compiles each human readable statement into one or more machine readable instructions. The process of compiling the human readable statement into one or more machine readable instructions typically involves translating the human readable statements into one or more intermediate code forms prior to conversion to machine readable statements. The intermediate codes, within this specification, can either be machine independent or machine dependent.

Machine-independent intermediate code form is, of course, machine independent. This form of code is general enough to be used to represent the source code written in any of the high level languages. Because of it's generality, it does not contain any instructions which tie it to a specific machine's architecture.

Machine-dependent intermediate code form is, of course, machine dependent, and has a very close relationship with the particular hardware platform's machine code. Thus, there exists a near one-to-one relationship with the instructions in the machine-dependent intermediate code and the instructions that exist in machine code.

A compiler may reside within the memory of the computer which will be used to execute the machine code, or may reside on a separate computer system. Compilers that reside on one computer system and are used to generate machine code for other computer systems are typically called "cross compilers." The methods and apparatus discussed herein apply to all types of compilers, including cross compilers.

Special compilers, called optimizing compilers, typically operate on the intermediate language instruction stream to make it perform better (e.g., by eliminating unneeded instructions, etc.). Some modern optimizing compilers are divided into a "front-end" and a "back-end." The front-end typically is machine-independent and serves to translate the high level source code to a machine-independent, intermediate code form. The back-end then operates on the intermediate code instruction stream to optimize it and convert it into machine readable form.

The two-part compiler has several advantages, the most notable being its flexibility. Because modern front-end compilers are machine independent they can be used for a variety of computer architectures.

When the program code is processed by the compiler back-end the code is typically optimized. The optimization of code is done to increase the performance of the code, i.e., to make the code run in a faster, more efficient manner. These optimizations can include both machine-independent and machine-dependent optimization methods.

The compiler back-end will typically translate the optimized intermediate code into a machine-dependent assembler code. The machine-dependent assembler code can then be assembled into machine code, which is directly readable by a computer. Alternatively, the compiler back-end can translate the optimized intermediate code directly into machine code. The machine code is linked together and is ready to be run by an appropriate computer system.

Code Integration Mechanisms

Unfortunately, even the most advanced optimizing compilers are unable to generate code that is as efficient as user-defined code. This results in inefficiencies and slower performance than can be achieved with code that is user-defined by an experienced programmer. Again, this user-defined code is written in a low level language, such as assembler code. Because assembler code is essentially a human readable representation of machine code, with a one-to-one correlation, a programmer can precisely control the computer operations. This precise control of the instruction stream results in highly efficient resource allocation. For example, a function written in a high level language such as C and then compiled and optimized could require ten machine code operations to be performed. That same function written in a low level language, such as assembler code, and assembled into machine code could require only eight machine code operations. For this reason, functions that are extremely important to the performance of the computer program are typically written by the programmer in a low level language. These user-defined functions must then be integrated with the compiler-generated instructions.

Thus, previous methods of programming have traditionally been to write the majority of a computer program in a high level language while writing some portions in a low level language. The high level language portions are compiled by the compiler front-end into machine-independent intermediate code. The machine-independent code form serves as a independent interface between compiler front-ends and compiler back-ends. These compiler-generated instructions are then optimized by the compiler back-end. The compiler back-end then generates machine-dependent code from the optimized machine-independent intermediate code. This machine-dependent code can either be assembler code, or another intermediate code which has a close correlation with assembler code, and in many cases a one-to-one correlation. In the case where machine-dependent intermediate code is generated, further machine-dependent optimizations may take place. The compiler then generates assembler code from the machine-dependent intermediate code, or alternatively, generates machine code.

The user-defined portions of the program are then merged with the compiler generated code. Typically, this merger has simply been the insertion of the user-defined code into the optimized compiler-generated instruction stream. Thus, the user-defined instructions are merged with the compiler-generated instructions after the compiler has optimized the compiler-generated instructions. Unfortunately, this has numerous disadvantages. First, because the compiler did not know the details of the user-defined instructions during optimization, its optimization decisions were based solely on the compiler-generated instructions with no regard for the fact that the user-defined instructions, once integrated, could have dramatic effects on those optimization decisions. Second, the user-defined code may have been carefully crafted to perform well, but performance could be negatively impacted when the code is integrated into an unknown context. And finally, the user-defined code is never optimized by the compiler. The result being an integrated instruction stream that is non-optimal.

Figure 1:
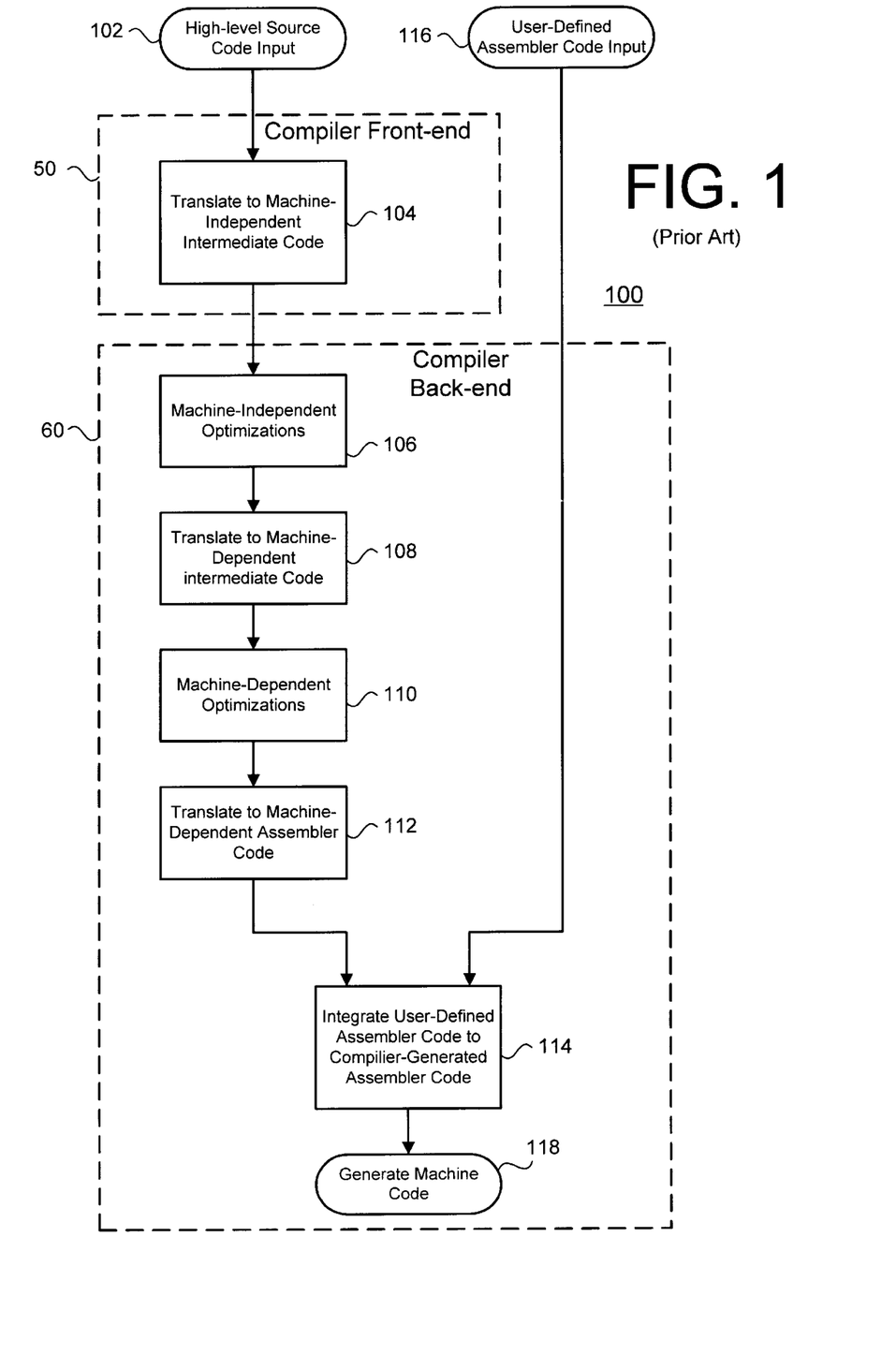
FIG. 1 is a flow diagram view illustrating a method for integrating user-defined instructions with compiler generated instructions.

One possible process for integrating user-defined instruction streams with compiler-generated instruction streams is illustrated in FIG. 1. FIG. 1. shows a compilation, optimization and integration method 100. The optimization method 100 is typically performed by a divided compiler, i.e., one that has a front-end component 50 and a back-end component 60, although it should be understood that the methods and apparatus disclosed herein apply equally as well to a compiler which is not divided. Having a divided compiler allows for great flexibility in source code languages used and target hardware platforms. In particular, there would typically be a different compiler front-end 50 for each of the various types of high level source code languages, such as C++ and Pascal. Likewise, there would be a separate back-end compiler 60 for each hardware platform. Thus, a complete compiler can be created for any high level source code language and hardware platform combination by selecting the appropriate compiler front-end 50 and back-end 60.

High level source code serves as an input 102 to a compiler front-end 50. Again, this high level source code could be written in any of the various types of high level languages. The compiler front-end 50 serves to translate the high level source code input to a machine-independent intermediate code, illustrated by process step 104. The machine-independent code form serves as a independent interface between compiler front-ends and compiler back-ends. By translating the source code to a machine-independent intermediate code form, the front-end facilitates further compilation by a plurality of back-end compilers, with each back-end tuned to a specific hardware platform.

Thus, after having been translated to machine-independent intermediate form, the code is delivered to a compiler back-end 60. Again, each back-end compiler is specifically tuned to compile and optimize code for a particular hardware platform. The first step 106 performed by the compiler back-end 60 is to perform various machine-independent optimizations on the code. These optimizations would typically include common subexpression elimination, constant folding, copy propagation, dead code elimination, strength reduction, etc. Of course, the machine-independent optimizations could instead be performed by the compiler front-end 50 before transfer to the compiler back-end 60.

The next step 108 is to translate the code to a machine-dependent intermediate code form. This code form facilitates the compiler's next step 110 of performing machine-dependent optimizations on the intermediate code. These optimizations would typically include global register allocation, instruction scheduling, software pipelining and peephole optimizations.

The next step 112 is to translate the code to a machine-dependent assembler code form. This assembler code form is essentially a human readable form of machine code, and only needs to be assembled to machine code to be run by a computer. Thus, step 112 creates compiler-generated code, code that was defined and compiled by the compiler.

The next step 114 is to integrate the compiler-generated assembler code with the user-defined assembler code input 116. The user-defined assembler code input 116 constitutes the user-defined/low level language portions of the program code. As previously stated, the user-defined assembler code is typically the portions of the code for which speed and efficiency are critical, or for which there is no high level language equivalent. By user-defining these portions of the code, the efficiency of the code may be increased over compiler-generated instructions.

Thus, the integration of step 114 is simply the insertion of the user-defined assembler code portions into the compiler-generated assembler code instruction stream.

The next step 118 is to generate machine code from the integrated assembler code. This step creates the machine code which a computer will actually execute. Unfortunately, this process suffers from the limitations mentioned above. Namely, the compiler-generated code is optimized before the integration of the user-defined code. Thus, the optimization may be incomplete.

The remainder of this specification describes how a preferred embodiment of the present invention improves the integration of user-defined instructions into compiler-generated instruction streams. Those skilled in the art will appreciate that the present invention applies equally to any user-defined instruction stream and any compiler.

DETAILED DESCRIPTION

Figure 2:
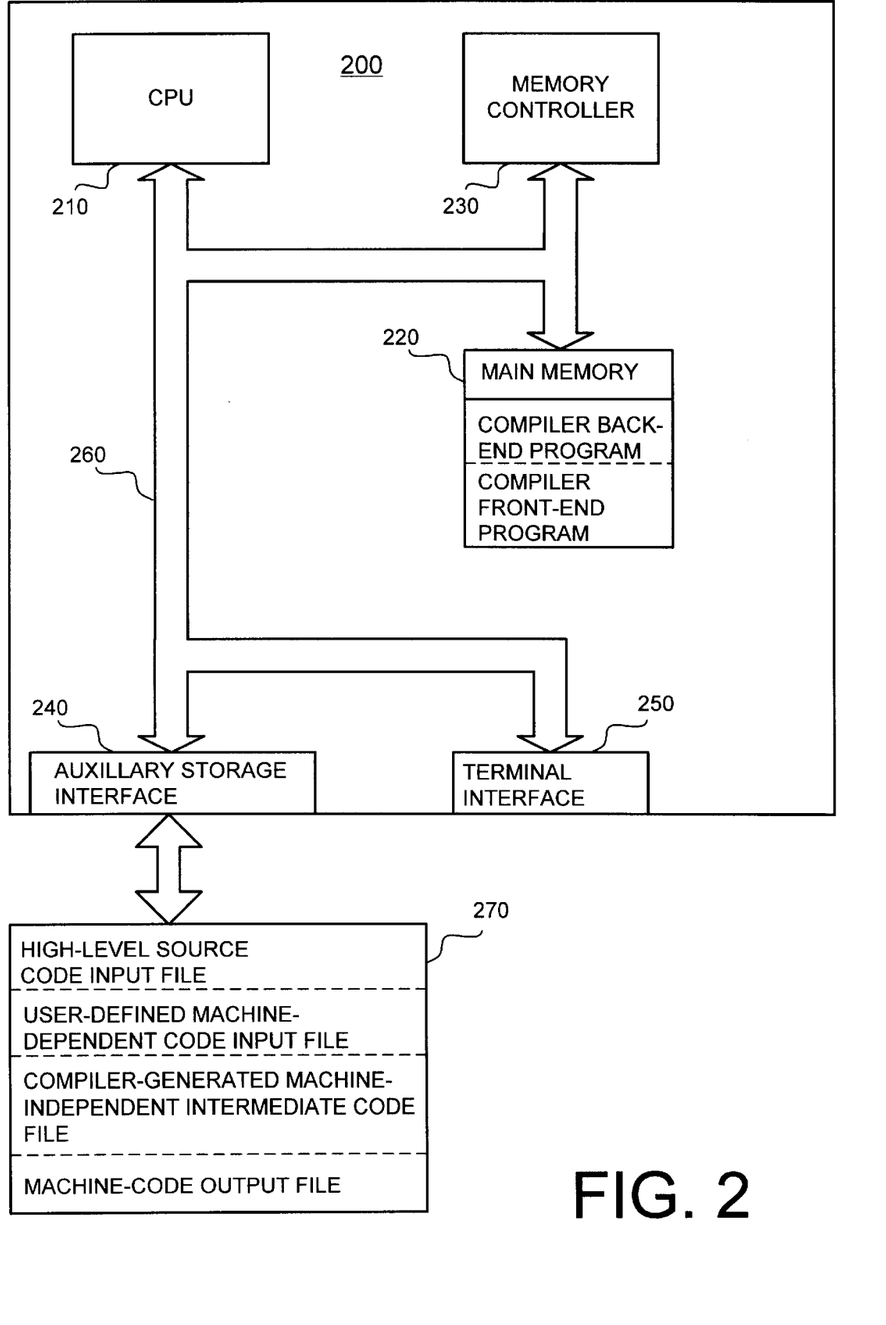
FIG. 2 is a schematic block diagram of a computer system in accordance with a preferred embodiment of the present invention.

Turning now to FIG. 2, FIG. 2 illustrates a computer system 200 in accordance with the present invention and is an enhanced IBM RS/6000 computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 200 suitably comprises a CPU 210, main memory 220, a memory controller 230, an auxiliary storage interface 240, and a terminal interface 250, all of which are interconnected via a system bus 260. Note that various modifications, additions, or deletions may be made to the computer system 200 illustrated in FIG. 2 within the scope of the present invention such as the addition of cache memory or other peripheral devices; FIG. 2 is presented to simply illustrate some of the salient features of computer system 200.

CPU 210 performs computation and control functions of computer system 200. CPU 210 may comprise a single integrated circuit, such as a microprocessor, or may comprise any suitable number of integrated circuit devices and/or circuit boards working in cooperation to accomplish the functions of a central processing unit. CPU 210 suitably executes an instruction stream stored in main memory 220. In accordance with the preferred embodiment, the main memory stores a compiler front-end and a compiler back-end program. Of course, in normal usage the main memory may contain only one portion of the compiler at a time, with the other portion residing in mass memory and accessed by CPU 210 via auxiliary storage interface 240. It should also be understood that main memory 220 will not necessarily contain all parts of all mechanisms shown. For example, portions of front and back end compilers may be loaded in an instruction cache (not shown) for CPU 210 to execute, while other portions may well be stored on auxiliary storage 270 through auxiliary storage interface 240.

Auxiliary storage interface 240 is used to allow computer system 200 to store and retrieve information from auxiliary storage 270, such as magnetic disk (e.g., hard disks or floppy diskettes) or optical storage devices (e.g., CD-ROM). In a typical embodiment, a high level source code input file, a user-defined machine-dependent code input file, a compiler-generated machine-independent intermediate code file and a machine code output file would all be stored on auxiliary storage 270 at various times in the compilation process. Note, however, that the components of auxiliary storage 270 shown in FIG. 2 could also be located within main memory 220 as space permits.

Memory controller 230, through use of a processor separate from CPU 210, is responsible for moving requested information from main memory 220 and/or through auxiliary storage interface 240 to CPU 210. While for the purposes of explanation, memory controller 230 is shown as a separate entity, those skilled in the art understand that, in practice, portions of the function provided by memory controller 230 may actually reside in the circuitry associated with CPU 210, main memory 220, and/or auxiliary storage interface 240.

Terminal interface 250 allows system administrators and computer programmers to communicate with computer system 200, normally through programmable workstations. Although the system 200 depicted in FIG. 2 contains only a single main CPU 210 and a single system bus 260, it should be understood that the present invention applies equally to computer systems having multiple main CPUs and multiple system buses. Similarly, although the system bus 260 of the preferred embodiment is a typical hardwired, multidrop bus, any connection means that supports bi-directional communication could be used.

Figure 3:
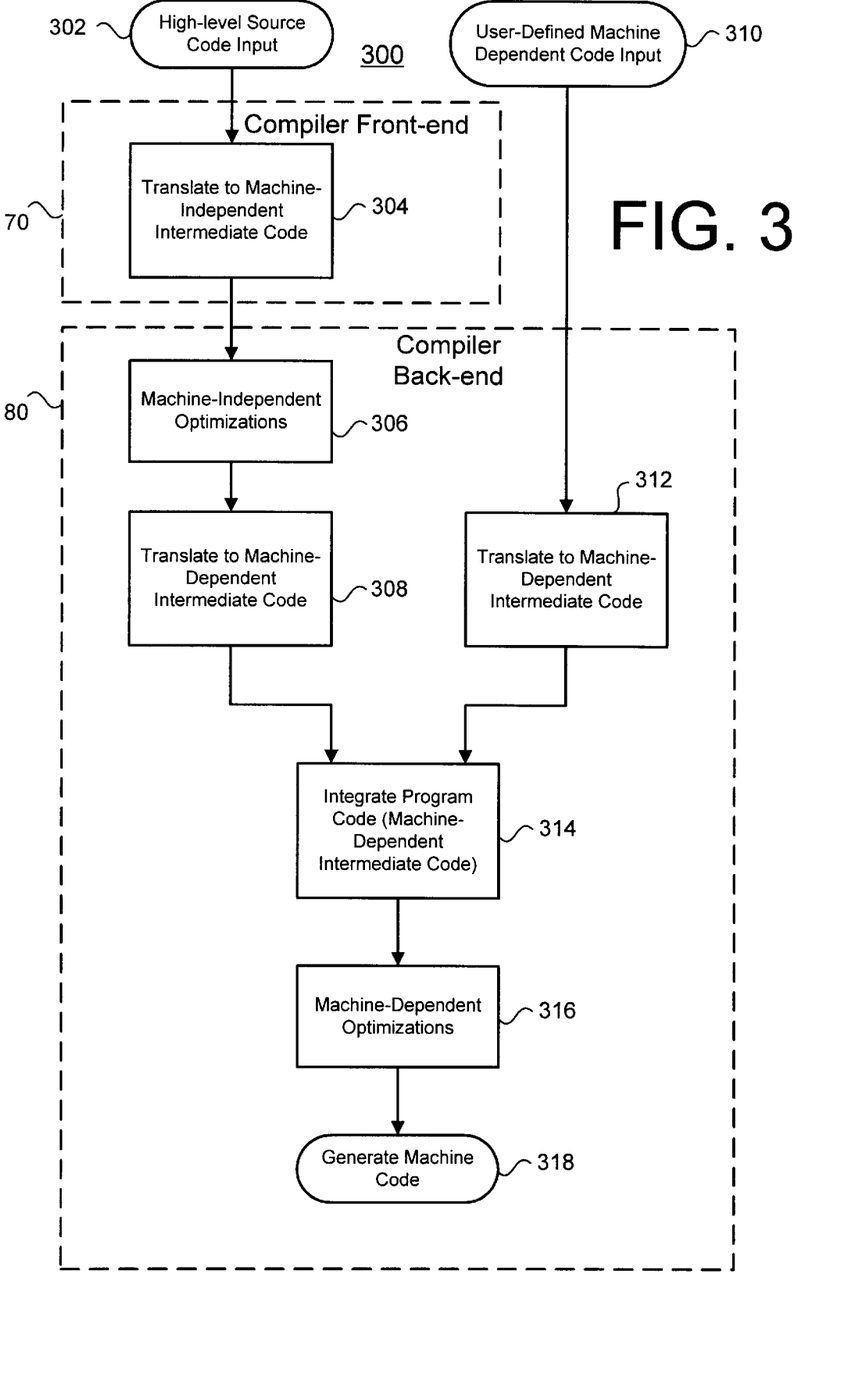
FIG. 3 is a flow diagram view illustrating an integration method in accordance with a preferred embodiment of the present invention.

Turning now to FIG. 3, FIG. 3 illustrates an improved process 300 for integrating user-defined instruction streams with compiler-generated instruction streams. Similar to the process 100 of FIG. 1, the process 300 is implemented using a compiler divided into a compiler front-end 70 and a compiler back-end 80 for source-code and hardware platform flexibility. The integration process 300 integrates a compiler-generated instruction stream with a user-defined instruction stream. The compiler-generated instruction stream is generated from a high level source code input 302 while the user-defined instruction stream comes from user-defined machine-dependent code input 310.

To facilitate integration according to the preferred embodiment, the user-defined machine-dependent code is written in a machine-dependent, assembler type low level language. Or in the alternative, in a pseudo-assembler type language, wherein the pseudo-assembler language allows symbolic operands, such as symbolic registers and memory references to be used. These languages typically have a near one-to-one correlation between instructions and corresponding machine code instructions.

Additionally, in the preferred embodiment, the user-defined machine-dependent code input 310 would contain compiler directive mechanisms to control the machine-dependent optimizations. These mechanisms, herein referred to as "pseudo-ops," are instructions in the user-defined code input 310. Translation of the pseudo-ops does not result in any machine code generation by the compiler. Instead, the pseudo-ops are used to direct the actions of the compiler, to make the compiler perform in ways it may not normally.

High level source code serves as an input 302 to a compiler front-end 70. Again, this high level source code could be written in any of the various high level languages. The compiler front-end 70 serves to translate the high level source code input to a machine-independent intermediate code, illustrated by process step 304. The machine-independent intermediate code serves as an independent interface between compiler front-ends and compiler back-ends. By translating the source code to a machine-independent intermediate form, the front-end facilitates further compilation by a plurality of back-end compilers, with each back end tuned to a specific hardware platform.

Thus, after having been translated to machine-independent intermediate form, the code is delivered to a compiler back-end 80. Again, each back-end compiler is specifically tuned to compile and optimize code for a particular hardware platform. The first step 306 performed by the compiler back-end 80 is to perform various machine-independent optimizations of the code. These optimizations would typically include common subexpression elimination, constant folding, copy propagation, dead code elimination, strength reduction, etc. Of course, the machine-independent optimizations could instead be performed by the compiler front-end 70 before transfer to the compiler back-end 80.

The next step 308 is to translate the partially optimized machine-independent intermediate code to a machine-dependent intermediate code form. This machine-dependent intermediate code form is, of course, machine dependent, and has a very close relationship with the particular hardware platform's machine code. Likewise, the user-defined machine-dependent code input 310 is also translated to machine-dependent intermediate code form by step 312. The user-defined machine-dependent code 310 also has a very close relationship with the particular hardware platform's machine code. Thus, there exists a near one-to-one relationship with the instructions in the machine-dependent intermediate code, the user-defined machine-dependent code, and the particular hardware platform's machine code. In the preferred embodiment, given any single machine instruction, there exists a single form of user-defined machine-dependent instruction that can represent it. Likewise, there exists a single form of a machine-dependent intermediate instruction that can represent it. So while there may exist a machine-dependent intermediate instruction that in several different forms may represent several different machine code instructions, for each single machine code instruction or user-defined machine dependent instruction, there exists a single form of the machine-dependent intermediate code instruction that can represent it.

For example, in machine code there could exist an ADD instruction and an ADD IMMEDIATE instruction. The ADD instruction adds two registers, while the ADD IMMEDIATE instruction adds a register with an immediate value. However, in the machine-dependent intermediate code there may be only a single ADD instruction that can take two forms. One form is defined as being able to take two registers as operands, the other form takes one register and an immediate value as operands. So while there may be only one machine-dependent intermediate code instruction, there exists a one-to-one mapping back to that instruction for each of the two machine code instructions.

Because of the close relationship between machine-dependent intermediate code and the machine code, the user-defined machine-dependent code input 310 can be translated up to machine-dependent intermediate code form without losing the inherent efficiencies of well-designed user-defined code.

In the preferred embodiment, as part of step 312 any pseudo-ops present in the user-defined machine-dependent code input 310 would also be converted to a form compatible with machine-dependent intermediate code. Thus, in the preferred embodiment, there are corresponding pseudo-ops in the machine-dependent intermediate code form to those in the user-defined machine-dependent code form. This allows the pseudo-ops to be present and to serve as compiler directive mechanisms during machine-dependent optimizations, which are performed later in the preferred embodiment.

The next step 314 is to integrate the machine-dependent intermediate code created from the user-defined machine-dependent code with the machine-dependent intermediate code created from the machine-independent intermediate code. Because both code streams are now in the same machine-dependent intermediate code form, they can be easily integrated by simply inserting the user-defined instruction stream into the compiler-generated instruction stream.

The next step 316 is to perform a variety of machine-dependent optimizations. Again, these machine dependent optimizations would typically include global register allocation, instruction scheduling, software pipelining and peephole optimizations. Of course, other types of machine optimizations could be performed at this time, including machine independent optimizations if so desired. Having the optimizations performed after integration has the benefit of including the user-defined instructions in the optimization process. Thus, the optimizer can account for the user-defined instructions, resulting in improved optimization throughout the code.

During the machine-dependent optimizations of step 316, the compiler directive mechanism or pseudo-ops contained in the code can be used to control the optimizations performed by the compiler. For example, the user-defined machine code input 310 could contain a pseudo-op directing the compiler to leave a group of instructions in a predetermined order, i.e., the order they were written by the programmer. This result may be desired for hardware or functional reasons, even though a typical compiler would otherwise determine that from a data dependence point of view they could be legally rearranged. Thus, the pseudo-op flags group of instructions so the compiler will not reorder them even if the compiler believes such a reordering would be more efficient.

As a second example, in some cases it is desirable for a program to contain code that would be considered redundant or unnecessary by the compiler. These cases are commonly seen where some hardware emulation is being used. The compiler would commonly seek to remove the code used for hardware emulation as redundant or unnecessary during dead code elimination optimization. In this and other cases where the programmer knows this code is desirable even though the compiler would want to remove it a pseudo-op can be used by the programmer to direct the compiler to leave the code intact.

Thus, the preferred embodiment allows for the programmer to have more control over how the compiler optimizes the code, particularly how it optimizes the machine dependent user-defined code input 310.

The next step 318 is to translate the integrated and optimized code into machine code form that can be read by the target computer system. Thus, the resulting machine code is well integrated and optimized. This results in code with fast and efficient performance.

Figure 4:
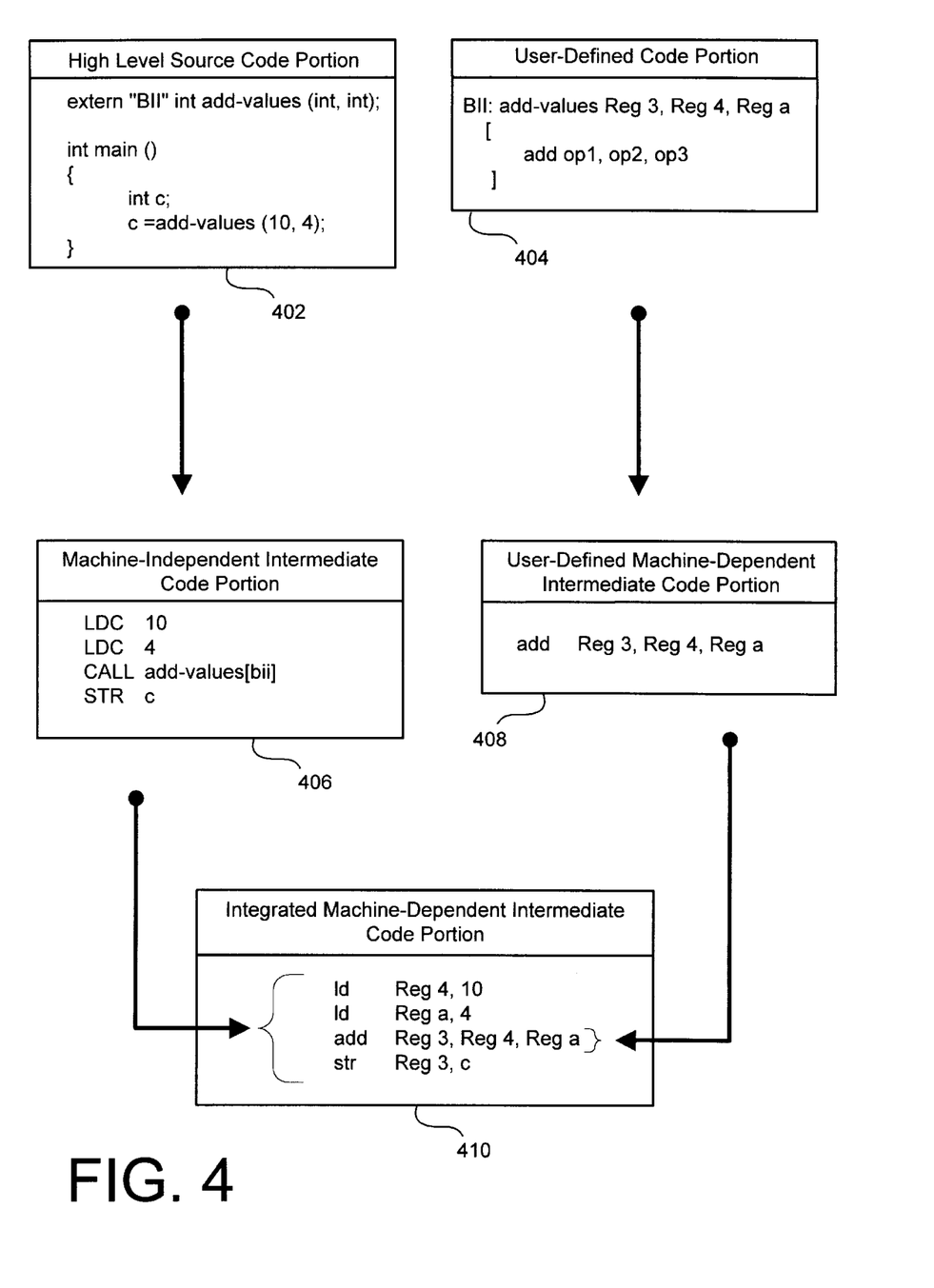
FIG. 4 is a representation of various code types in accordance with a preferred embodiment of the present invention.

Turning now to FIG. 4, FIG. 4 is a representation of various types of code instruction streams in accordance with the present invention. Initially, the majority of a computer program is written in a high level language, called source code. A portion of a source code instruction stream in C++ is illustrated as code stream 402. When compiled, the source code will constitute compiler-generated code. Other portions of the computer program are written in a machine-dependent, assembler-type language to allow for efficient, user-defined code. A portion of user-defined code 404 is illustrated in FIG. 4. The user-defined code 404 is a pseudo-assembler code, having a one-to-one relationship with machine code but allowing the use of symbolic operands.

The first step is typically to convert the high level source code 402, to a machine-independent, intermediate code form. The intermediate code stream 406 illustrates a source code 402 translated to machine-independent, intermediate form. The machine-independent code form serves as an independent interface between compiler front-ends and compiler back-ends.

The next step is to convert the user-defined code, and the compiler-generated machine-independent intermediate code to a machine-dependent, intermediate form, and integrate the code streams together. In particular, the machine-independent intermediate code 406 is translated to machine dependent, intermediate code. Likewise, the user-defined code 404 is translated to machine-dependent intermediate form code 408, and then integrated into the compiler-generated code stream, resulting in an integrated code stream 410. Note that in the machine-independent intermediate code 406, the user-defined code exists only as a specially tagged procedure call in order to hide the machine-dependent characteristics of the user-defined code from being exposed. In the illustrated example, the special "BII" linkage type on the function prototype in the C++ source code 402 instructs the compiler front-end to add the special tag to the call. The integration of the user-defined code with the compiler generated code involves replacing this procedure call with the actual user defined code resulting in the integrated machine-dependent intermediate code stream 410.

The integrated code stream 410 can then be further optimized, and translated into machine code, for running on a computer. Using this method, results in highly optimized machine code, with well integrated user-defined portions.

It is important to note that while the present invention has been described in the context of a method for integrating a user-defined instruction stream with a compiler-generated instruction stream, those skilled in the art will appreciate that the present invention has application as a computer implemented method in the context of a fully functional computer system. Additionally, the mechanisms of the present invention are capable of being distributed as a program product in a variety of forms, and that the present invention applies equally regardless of signal bearing media used to actually carry out the distribution. Examples of signal bearing media include: recordable type media such as floppy disks and CD ROMs and transmission type media such as digital and analog communication links.

While the invention has been particularly shown and described with reference to preferred exemplary embodiments thereof, it will be understood by those skilled in the art that various changes in form and details may be made therein without departing from the spirit and scope of the invention. For example, the preferred embodiment can be implemented for any type of source code and hardware platform combination.

We claim:

1. A computer apparatus comprising:
   (A) a central processing unit;
   (B) a compiler for integrating a user-defined instruction stream with a compiler-generated instruction stream, the compiler comprising:
      i) an instruction stream translation mechanism, said instruction stream translation mechanism translating said user-defined instruction stream to a first machine-dependent intermediate instruction stream and translating said compiler-generated instruction stream to a second machine-dependent intermediate instruction stream;
      ii) an integration mechanism, said integration mechanism integrating said first machine-dependent intermediate instruction stream with said second machine-dependent intermediate instruction stream; and
      iii) an optimizing mechanism, said optimizing mechanism optimizing said integrated instruction stream.

2. The computer apparatus of claim 1 wherein said optimizing mechanism performs a machine-dependent optimization.

3. The computer apparatus of claim 1 wherein said compiler further comprises a generating mechanism to generate machine code from said integrated instruction stream.

4. The computer apparatus of claim 1 wherein said user-defined instruction stream comprises at least one compiler directive mechanism.

5. A program product, said program product comprising:
   (A) a compiler, the compiler used for integrating a user-defined instruction stream with a compiler-generated instruction stream, the compiler including:
      i) an instruction stream translation mechanism, said instruction stream translation mechanism translating said user-defined instruction stream to a first machine-dependent intermediate instruction stream and translating said compiler-generated instruction stream to a second machine-dependent intermediate instruction stream;
      ii) an integration mechanism, said integration mechanism integrating said first machine-dependent intermediate instruction stream with said second machine-dependent intermediate instruction stream;
      iii) an optimizing mechanism, said optimizing mechanism optimizing said integrated instruction stream
   (B) signal bearing media bearing said compiler.

6. The program product of claim 5 wherein said signal bearing media comprises recordable media.

7. The program product of claim 5 wherein said signal bearing media comprises transmission media.

8. The program product of claim 5 wherein said optimizing mechanism performs a machine-dependent optimization.

9. The program product of claim 5 wherein said compiler further comprises a generating mechanism to generate machine code from said integrated instruction stream.

10. The program product of claim 5 wherein said user-defined instruction stream comprises at least one compiler directive mechanism.

11. A method for integrating a user-defined instruction stream with a compiler-generated instruction stream, comprising the steps of:
   a) translating said user-defined instruction stream to a first machine-dependent intermediate instruction stream;
   b) translating said compiler-generated instruction stream to a second machine-dependent intermediate instruction stream;
   c) integrating said first machine-dependent intermediate instruction stream with said second machine-dependent intermediate instruction stream; and
   d) optimizing said integrated instruction stream.

12. The method of claim 11 wherein said step of optimizing comprises a machine-dependent optimization.

13. The method of claim 11 further comprising the step of generating machine code from said integrated instruction stream.

14. The method of claim 11 wherein said compiler-generated instruction stream is an optimized instruction stream.

15. The method of claim 11 wherein said user-defined instruction stream comprises at least one compiler directive mechanism.

16. A method for integrating a user-defined instruction stream with a compiler-generated instruction stream, comprising the steps of:
   a) optimizing said compiler-generated instruction stream;
   b) translating said optimized compiler-generated instruction stream to a first machine-dependent intermediate instruction stream;
   c) translating said user-defined instruction stream to a second machine-dependent intermediate instruction stream;
   d) integrating said first machine-dependent intermediate instruction stream with said second machine-dependent intermediate instruction stream;
   e) optimizing said integrated instruction stream; and
   e) translating said optimized integrated instruction stream to a machine code instruction stream.

17. The method of claim 16 wherein said step of optimizing comprises a machine-dependent optimization.

18. The method of claim 16 further comprising the step of generating machine code from said integrated instruction stream.

19. The method of claim 16 wherein said user-defined instruction stream comprises at least one compiler directive mechanism and wherein the step of optimizing comprises optimizing according to said at least one compiler directive mechanism.

20. A computer implemented method for integrating a user-defined instruction stream with a compiler-generated instruction stream, comprising the steps of:

a) translating said user-defined instruction stream to a first machine-dependent intermediate instruction stream;

b) translating said compiler-generated instruction stream to a second machine-dependent intermediate stream;

c) integrating said first machine-dependent intermediate instruction stream with said second machine-dependent intermediate instruction stream; and d) optimizing said integrated instruction stream.

21. The method of claim 20 wherein said step of optimizing comprises a machine-dependent optimization.

22. The method of claim 20 further comprising the step of generating machine code from said integrated instruction stream.

23. The method of claim 20 wherein said compiler-generated instruction stream is an optimized instruction stream.

24. The method of claim 20 wherein said user-defined instruction stream comprises at least one compiler directive mechanism.

* * * * *